United States Patent
Daum et al.

(10) Patent No.: US 9,573,155 B2
(45) Date of Patent: Feb. 21, 2017

(54) DEVICE FOR APPLYING ADHESIVE TO A MATERIAL

(71) Applicant: WINKLER & DÜNNEBIER GMBH, Neuwied (DE)

(72) Inventors: Thomas Daum, Nenterhausen (DE); Daniel Bäth, Köln (DE)

(73) Assignee: WINKLER + DÜNNEBIER GMBH, Neuwied (DE)

( * ) Notice: Subject to any disclaimer, the term of this patent is extended or adjusted under 35 U.S.C. 154(b) by 88 days.

(21) Appl. No.: 14/397,758

(22) PCT Filed: Apr. 29, 2013

(86) PCT No.: PCT/EP2013/001273
§ 371 (c)(1),
(2) Date: Oct. 29, 2014

(87) PCT Pub. No.: WO2013/164081
PCT Pub. Date: Nov. 7, 2013

(65) Prior Publication Data
US 2015/0132480 A1    May 14, 2015

(30) Foreign Application Priority Data
Apr. 30, 2012 (DE) .................. 10 2012 207 206

(51) Int. Cl.
*B05C 5/02* (2006.01)
*B05C 5/00* (2006.01)
(Continued)

(52) U.S. Cl.
CPC ............. *B05C 5/00* (2013.01); *B05B 15/0208* (2013.01); *B05C 5/025* (2013.01); *B05C 5/027* (2013.01);
(Continued)

(58) Field of Classification Search
None
See application file for complete search history.

(56) References Cited

U.S. PATENT DOCUMENTS

| 5,830,297 A * | 11/1998 | Nakahira | B05C 5/0208 118/702 |
| 6,050,314 A * | 4/2000 | Kakishima | B05B 15/0208 118/256 |
| 2012/0121803 A1 | 5/2012 | Pahl et al. | |

FOREIGN PATENT DOCUMENTS

| DE | 210180 | 1/1971 |
| DE | 102007002980 | 7/2008 |

(Continued)

OTHER PUBLICATIONS

Carver, Trade Foundations Based on Producing Industries, Guy. M Jones Company, (1919), pp. 24.*

(Continued)

*Primary Examiner* — Lisha Jiang
(74) *Attorney, Agent, or Firm* — Henry M. Feiereisen LLC

(57) ABSTRACT

An adhesive application device for applying, includes a nozzle unit having a number of nozzles for applying an adhesive to a material which is moved along a direction of transport, said nozzles being displaceable transversely to the direction of transport along a first guide spindle; and plural individual gluing heads, each being arranged separately from each other on respective second separate guide spindles, so as to be displaceable transversely to the direction of transport.

6 Claims, 2 Drawing Sheets

(51) Int. Cl.
*C09J 5/00* (2006.01)
*B05B 15/02* (2006.01)
*B31B 19/00* (2006.01)
B05C 11/10 (2006.01)
B29C 31/02 (2006.01)

(52) U.S. Cl.
CPC .................. *B31B 19/00* (2013.01); *C09J 5/00* (2013.01); *B05C 11/1039* (2013.01); *B29C 31/02* (2013.01); *B31B 2219/6007* (2013.01); *B31B 2219/9045* (2013.01); *B31B 2221/107* (2013.01); *Y10T 156/1798* (2015.01)

(56) References Cited

FOREIGN PATENT DOCUMENTS

DE 102009035152 3/2011
EP 0816232 1/1998

OTHER PUBLICATIONS

International Search Report issued by the European Patent Office in International Application PCT/EP2013/001273.

* cited by examiner

_DEVICE FOR APPLYING ADHESIVE TO A MATERIAL_

CROSS-REFERENCES TO RELATED APPLICATIONS

This application is the U.S. National Stage of International Application No. PCT/EP2013/001273, filed Apr. 29, 2013, which designated the United States and has been published as International Publication No. WO 2013/164081 and which claims the priority of German Patent Application, Serial No. 10 2012 207 206.3, filed Apr. 30, 2012, pursuant to 35 U.S.C. 119(a)-(d).

BACKGROUND OF THE INVENTION

The invention relates to an adhesive application device for applying an adhesive to a material which is moved along a direction of transport x, comprising a nozzle unit having a number of nozzles for applying the adhesive to the material, and to a method for applying adhesive to a material which is moved along a direction of transport x.

Adhesive application devices of this type are used for example in the production of window envelopes. In this case, as a rule first of all a web of paper is guided through a roller system having a number of cutter rollers or similar cutting implements in order to produce an envelope blank. In this case, in a separate cutting process the envelope blank is provided with a cutout for a window. Around this cutout, in a subsequent method step, an adhesive agent is then applied, and a window material is glued on. In this case, as a rule a roller system is also resorted to for applying the adhesive agent. A gumming roller comprising adhesive stamp or a format part for applying the adhesive agent to the envelope blank or to a window film which is adapted to the height and width of the window is rolled onto the envelope blank or the window film, so that the edges of the cutout are provided with sufficient adhesive agent. What is disadvantageous about this method is that a variation in the size of the window, but also a variation in the positioning of the window, always results in the gumming roller being replaced. Thus not only does a separate gumming roller have to be provided and held available for each desired format, they even have to be changed in a costly manner and with production being stopped upon each change of format.

In the case of gluing of paper or cardboard blanks over a large surface area, in addition to the above-mentioned gumming rollers also strips comprising a number of metering nozzles, through which an adhesive agent or an adhesive is applied to the blank, are used. A nozzle system of this type is known for example from the document DE 10 2007 002 980 A1. The metering strip in this case extends over the entire width of the paper web and comprises a number of individual nozzles which are arranged at fixed distances from one another and can be activated individually. Fixed systems of this type are, however, suitable only to a limited extent for use in gluing window elements and, furthermore, are very costly to clean. Owing to the only slight gap between the nozzles and the paper blanks or the roller which transports these paper blanks, cleaning of the nozzles is impeded, which again results in relatively long downtimes of the installation.

SUMMARY OF THE INVENTION

It is therefore the object of the invention to provide an adhesive application device of the above-mentioned type and a method for operating an adhesive device which can process gluing patterns of different sizes particularly flexibly and efficiently in a very simple manner.

With respect to the device, this object is achieved according to the invention in that the nozzle unit is arranged to be displaceable transversely to the direction of transport x along a first guide, spindle.

With respect to the method, this object is achieved according to the invention in that the nozzle unit comprising a number of nozzles is moved along a first guide spindle, transversely to the direction of transport, to the desired gluing position, the application of a first adhesive taking place via these nozzles.

Advantageous configurations are the subject matter of the dependent claims.

The invention is based on the concept that particularly flexible adaptation to different dimensions of the region which is to be provided with adhesive is possible when a fixed adhesive template or a format template can be dispensed with. For this reason, a nozzle unit comprising a number of nozzles was used. As has now been shown, the provision of very widely varying formats of gluing surfaces is made possible in particular when this nozzle unit is arranged to be movable and the gluing always takes place in the optimum gluing position. For this reason, the nozzle unit is arranged to be displaceable along a first guide spindle which runs transversely to the direction of transport of the material. Thus it is possible for the entire width of the material to be reached by the nozzle unit via the shortest paths possible. The nozzle unit in this case designates a system consisting of a plurality of gluing heads which can be displaced along a common guide spindle. These units can be connected together at fixed intervals, for example as a nozzle block, or alternatively be constructed to be individually movable.

For an arrangement of the individual gluing heads and the nozzles on the nozzle unit which is as space-saving as possible, and at the same time in order to provide gluing surfaces which are as large as possible, in an advantageous configuration these heads and nozzles are arranged in a row and transversely to the direction of transport. By means of this arrangement, as large a width of the gluing surface as possible can be reached using a fixed number of nozzles.

In order to further increase the flexibility of the adhesive application device for different gluing formats and also in order to provide the possibility of being able to resort to different adhesive agents, in a particularly advantageous configuration a further nozzle unit is provided which comprises a number of individual gluing heads which are displaceable relative to one another. This further nozzle unit or these individual gluing heads in this case are likewise arranged to be displaceable transversely to the direction of transport of the material along one guide spindle in each case.

In order to achieve particularly rapid and high strength, in this case the individual gluing heads are designed for applying hot glue, while the nozzles in the nozzle unit are designed for applying cold glue. The consequence of this is that, owing to the dot-wise application of hot glue at selected points of the gluing format, for example in the corners of a rectangular cutout in the material, a rapid adhesive action can occur and thus, for example when gluing windows, the second material which is placed on top in a subsequent production process produces a basic adhesion as quickly as possible which prevents initial slipping or detachment. The cold glue which is applied over a larger surface area by the nozzle unit hardens substantially more slowly, and thus ensures the permanent, long-lasting adhesive action.

For a particularly efficient and also flexible distribution of the adhesive, the application of the adhesive by the individual nozzles of the nozzle unit and also by the nozzles of the individual gluing heads in a preferred configuration of the adhesive application device can be activated individually and separately from one another. This results in rectangular gluing surfaces, such as are required for example when gluing windows, also being possible in a very simple, adhesive-saving manner. In the case of a rectangular gluing surface, for example in a first step, corresponding to the width of the rectangle, a specific number of adjacent nozzles would apply an adhesive before, in a number of further steps, only the outermost two nozzles of the above specific number of nozzles release adhesive, until the length of the rectangle is reached, before in a final step again all the above-specified nozzles apply adhesive to the web of material. In parallel with this method, the nozzles of the individual gluing heads may apply additional adhesive at selected points of the rectangle.

Owing to residual glue sticking to the nozzles and hence a clogging thereof, regular cleaning of said nozzles becomes necessary. For particularly simple cleaning of the nozzles on the nozzle unit or alternatively on the individual gluing heads, therefore, in an advantageous configuration cleaning stations are provided which are arranged in each case along the guide spindle in question. The nozzle unit or the individual gluing heads can thus be displaced along the guide spindle into the cleaning stations which, in order to have the shortest paths possible, are preferably located directly next to the transport roller for the material or to the conveyor. If production is interrupted, or alternatively during individual production stages in which no gluing is required, the nozzles can thus be pushed particularly easily out of the gluing position into a cleaning position in the cleaning station.

For automation of the cleaning operation or alternatively in order to generate cleaning instructions, the adhesive application device in a particularly preferred configuration comprises a signal unit, which comprises a measuring unit and an evaluation unit. The measuring unit in this case measures a cleaning parameter, for example by means of a sensor in the region of the nozzles, the time since the last cleaning of the nozzles or the number of gluing operations by the nozzles, and transmits this continually to an evaluation unit. This evaluation unit compares the measured value with a corresponding limit value stored in the evaluation unit. Exceeding of the limit value in this case is reported to the signal unit, which thereupon, depending on the result of the evaluation unit, emits a signal for automatic cleaning of the nozzles at the next interruption in the gluing process, or alternatively generates only a visual or acoustic warning signal for manual initiation of the cleaning process. In this case, a large number of rules and limit values for automatic cleaning of the nozzles can be stored in the evaluation unit.

The advantages achieved by the invention are in particular that, owing to the flexible positioning of the nozzle unit transversely to the direction of transport of the material and to the individual activation of the nozzles, a space-saving adhesive application device can be provided which can reproduce virtually any shape of a gluing surface without replacing format parts. Owing to the combination of the nozzle unit with a plurality of individual gluing heads and the operation with different glue types, both a rapid, initial and a secure, long-lasting adhesive action can thus be achieved. Furthermore, particularly simple cleaning of the nozzles which sometimes is conceivable even during operation of the installation is possible.

BRIEF DESCRIPTION OF THE DRAWING

An embodiment of the invention will be explained in greater detail with reference to drawings in which.

DETAILED DESCRIPTION OF PREFERRED EMBODIMENTS

Figure 1:
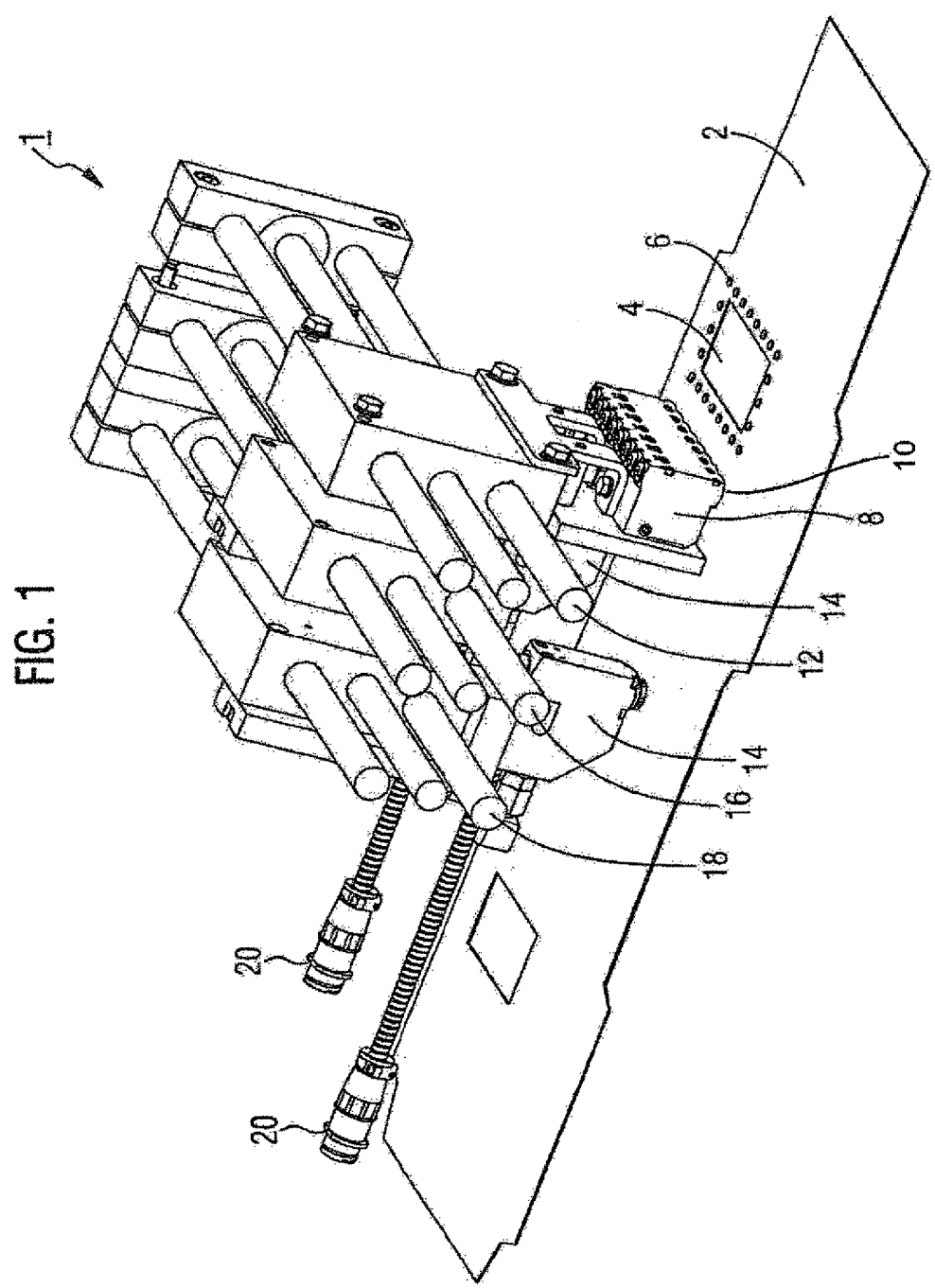
FIG. 1 is a detail of an adhesive application device.

A detail of an embodiment of an adhesive application device 1 is illustrated in FIG. 1. A material 2—what is shown is by way of example a web of material 2 which has already been cut laterally in a preceding operating step—in this case is guided along a direction of transport x. What is illustrated in this case is flat transport of the material 2, as might for example be realised by a belt conveyor. It is, however, conceivable also to transport the material 2 via a transport roller. When transporting the material 2 it is also possible to effect the application of the adhesive horizontally, that is to say that the material 2 is guided vertically downwards or upwards, while the adhesive application device is arranged such that the nozzle unit 8 and the individual gluing heads 14 spray the adhesive on horizontally.

The material 2 already has a number of cutouts 4 which, in the case of the production of envelopes, form the window element. One of these window elements 4 in the present embodiment has already passed the nozzle unit 8 and the individual gluing heads 14 for applying the adhesive, and is provided with a gluing pattern 6 which is arranged around the cutout 4. The gluing pattern 6 illustrated in this case consists of a number of individual adhesive dots, which consist of hot glue or cold glue, according to the activation of the nozzle unit 8 and the individual gluing heads 14. Alternatively, however, adhesive strips, in particular parallel to the direction of transport, are also conceivable. In particular when producing envelopes comprising window elements, in this case the application of the adhesive both to the window film and to the envelope blank is conceivable.

The application of the adhesive dots of cold glue takes place in this case via a nozzle unit 8 arranged directly above the web of material 2, which unit is formed as a nozzle block 8. This nozzle block 8 comprises a number of nozzles 10—in the present embodiment eight nozzle heads comprising one nozzle 10 each are provided on the nozzle block 8—by means of which the cold glue can be applied to the material 2. The nozzles 10 of the nozzle block 8 in the embodiment are in this case arranged at a fixed, unchangeable distance from one another. It is however likewise conceivable for the distance between the nozzles 10 in the nozzle unit 8 to be able to be varied individually. The nozzle block 8 in this case is arranged transversely to the direction of transport x of the material and can be moved or displaced over the entire width along three guide spindles 12 which are arranged mutually parallel. In this case, the outer two guide spindles 12 serve merely to guide and stabilise the nozzle block 8. Only the middle guide spindle has a thread for positioning the nozzle block 8. In addition to the nozzle block 8 for applying the cold glue, two individual gluing heads 14 are provided by which a hot glue can be applied to the material 2. The hot glue in this case ensures rapid initial adhesion when subsequently gluing to a second material or to a window element. The individual gluing heads 14 for applying the hot glue in this case are likewise arranged on separate guide spindles 16, 18 in each case and thus can be oriented individually transversely to the direction of transport x. The nozzles 10, both those of the nozzle block 8 and of the individual gluing heads 14, may in this case be activated individually by a control unit (not shown) in relation to the application of adhesive. In order to control the individual gluing heads 14, therefore, a line 20 is provided for each individual gluing head 14, via which line both the power is supplied and the control signals for the application of the adhesive are routed. The control and supplying of power to the nozzle unit 8 also take place via such a line (not shown).

The edge of the window elements on the web of material 2, upon passing through the gluing station, is thus first of all provided with a number of individual hot glue dots or lines before a cold glue gluing pattern is applied by the nozzle block 8.

A larger detail of an embodiment of an adhesive application device 1 is illustrated in Hg. 2, viewed from a different angle. In this case, likewise the cleaning station 22 is illustrated, which is arranged next to the web of material 2 (not shown), such that upon displacement of the nozzle block 8 and the individual gluing heads 14 along the guide spindles 12, 16, 18 next to the web of material 2 said nozzle blocks and heads are guided into the cleaning station 22. Both the gluing position of the nozzle unit 8 and of the individual gluing heads 14 and the cleaning position of the nozzle unit 8 and the individual gluing heads 14 thus lie along the guide spindles 12, 16, 18, so that it is possible to switch particularly simply and rapidly between the two positions. The cleaning station 22 in this case comprises a flushing chamber 24 and a cleaning chamber 26. In the cleaning chamber 26 there is arranged a rotatably mounted cleaning roller 28, in particular a foam roller, which in the case of cleaning the nozzles 10 is in direct contact with the nozzles 10 and frees the nozzles 10 from adhesive residues by means of a rotary movement of the cleaning roller 28. In this case, the cleaning roller 28 can be provided with a cleaning fluid, in particular a solvent, so that the adhesive residues can be removed particularly simply. The width of the cleaning roller 28 in this case is adapted to the width of the nozzle block 8, in order to be able to clean all the nozzles 10 of the nozzle block 8 in one operating step. In an alternative embodiment, the cleaning roller 28 may also be made smaller. In this case, it is then expedient if the nozzles 10 do not remain in the cleaning position, but are guided past the cleaning roller 28. The nozzles 10 are thus cleaned while they are passing by the rotating cleaning roller 28.

After the adhesive residues in the cleaning chamber 26 have been eliminated, the nozzle unit 8 and the individual gluing heads 14 can be pushed, again along the guide spindles 12, 16, 18, into a flushing chamber 24. In this flushing position, a short test run is carried out, during which adhesive is briefly released through the nozzles 10 into a collecting container 30. This spray burst with adhesive frees the nozzles 10 from dried adhesive residues in their interior. Then the nozzle unit 8 and/or the individual gluing heads 14 are pushed back into the cleaning position, where final cleaning is performed by the moistened cleaning roller 28.

These cleaning cycles in this case are monitored and checked by a signal unit (not shown). In this case, the time which has elapsed since the last cleaning of the nozzle unit 8 and the individual gluing heads 14 is measured continuously by a measuring unit. As soon as this measured time exceeds a first limit value, cleaning of the nozzle unit 8 and the individual gluing heads 14 corresponding to the cleaning sequence described above is initiated automatically at the next stoppage of the machine. If no stoppage of the machine is intended or effected and the measured time also exceed a second limit value, a warning, for example in the form of a visual or acoustic signal, is emitted, which indicates that it is urgently required to clean the nozzle unit 8 and the individual gluing heads 14. Then the machine can be stopped manually, so that the cleaning process can be carried out automatically or likewise manually. It is likewise conceivable for the installation automatically to stop and carry out the cleaning process if the second (or a third) limit value is exceeded. Once the cleaning operation has concluded, the time measurement is restarted.

In addition to measuring the time since the last cleaning, it is likewise possible to monitor further parameters for the state of the gluing heads or their nozzles by appropriate sensors, and, if they exceed or fall below a limit value, to initiate cleaning accordingly.

Figure 2:
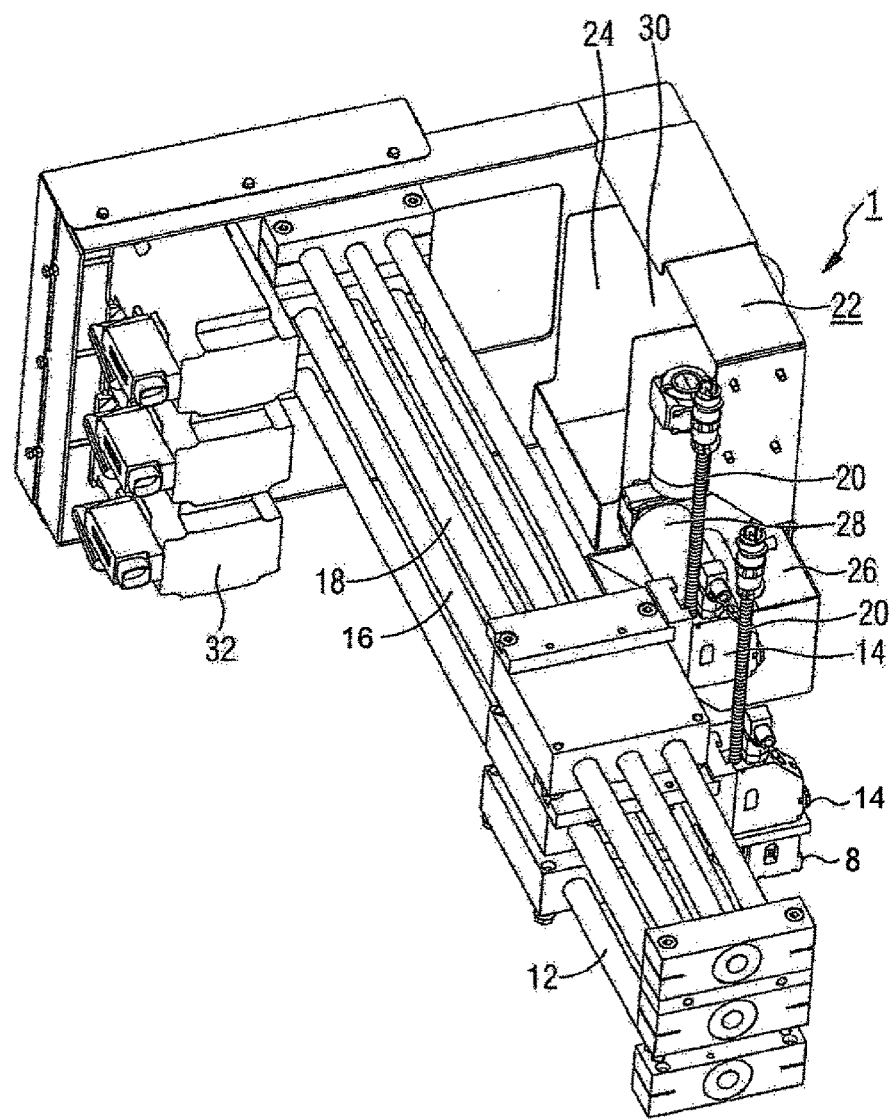
FIG. 2 is a detail of an adhesive application device comprising a cleaning station and drive units.
Identical parts are provided with the same reference numerals in all the figures.

The adhesive application device 1 according to the embodiment of FIG. 2 furthermore comprises a number of drive units 32 for moving the nozzle unit 8 and the individual gluing heads 14 along the respective guide spindle 12, 16, 18. In the embodiment illustrated, the movement takes place automatically by means of an electric motor and a toothed-belt system (not shown). However, manual displacement of the nozzle unit 8 and the individual gluing heads 14 by crank handles is likewise conceivable.

What is claimed is:

1. An adhesive application device for applying, comprising:
   a nozzle unit having a number of nozzles for applying an adhesive to a material which is moved along a direction of transport, said nozzles being displaceable transversely to the direction of transport along a first guide spindle; and
   plural individual gluing heads, each being arranged separately from each other on respective second separate guide spindles, so as to be displaceable transversely to the direction of transport.

2. The adhesive application device of claim 1, wherein the nozzles are arranged in the nozzle unit in series and transversely relative to the direction of transport.

3. The adhesive application device of claim 1, wherein the nozzle unit is designed for applying cold glue, and the individual gluing heads are designed for applying hot glue.

4. The adhesive application device of claim 1, further comprising a control unit operably connected to the nozzles of the nozzle unit and the individual gluing heads, said nozzles and said individual gluing heads being separately activatable by the control unit for applying adhesive.

5. The adhesive application device of claim 1, further comprising plural cleaning stations arranged along one or more of the first and second guide spindles.

6. The adhesive application device of claim 5, further comprising a signal unit comprising a measuring unit for measuring a measured value and an evaluation unit for evaluating the measured value, said signal unit emitting a signal for cleaning the nozzle unit and/or the individual gluing heads in one of the cleaning stations when the measured value exceeds a limit value.

* * * * *